Nov. 17, 1970    H. G. VORE ET AL    3,540,082
PORTABLE INJECTION MOLDING MACHINE
Filed July 9, 1968    2 Sheets-Sheet 1

INVENTORS
HERBERT G. VORE
DONALD E. BARDSLEY
ROBERT N. OWLER
BY
AGENT

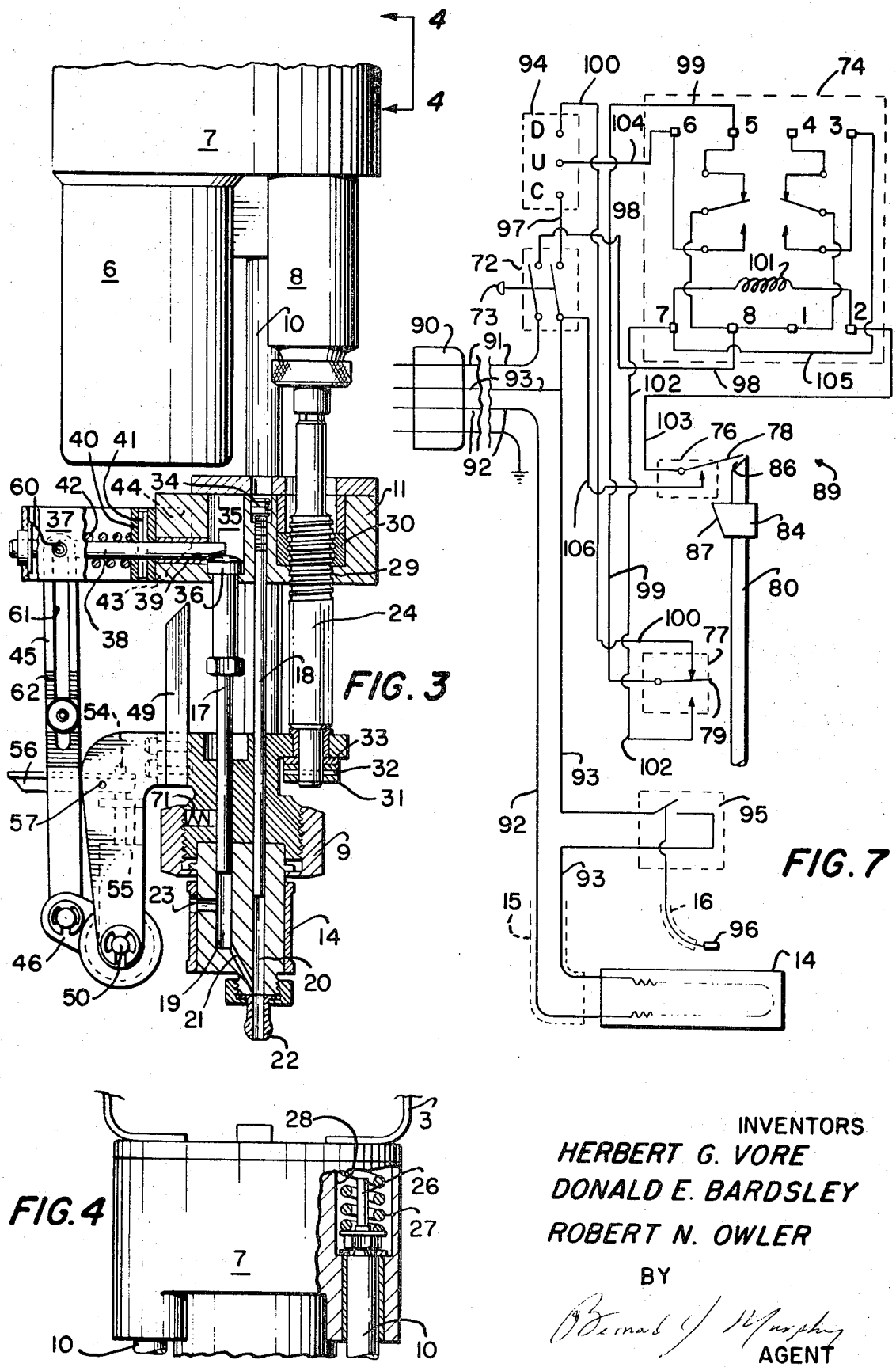

United States Patent Office
3,540,082
Patented Nov. 17, 1970

3,540,082
PORTABLE INJECTION MOLDING MACHINE
Herbert G. Vore and Donald E. Bardsley, Nashua, N.H., and Robert N. Owler, Westminster, Mass., assignors to Improved Machinery Inc., Nashua, N.H., a corporation of Delaware
Filed July 9, 1968, Ser. No. 743,547
Int. Cl. B29f 1/00
U.S. Cl. 18—30          23 Claims

ABSTRACT OF THE DISCLOSURE

A portable and automatic injection molding machine with a spring-loaded friction clutch communicating a reversible drive with a movable piston carrier. The carrier automatically effects feed of plastic stock and moves a plasticizing piston and injection piston to plasticize and inject plastic material, and has a spring-loaded displaceable latch for freeing the former piston from the motive force of the carrier permitting continued, independent travel of the latter piston while the former is at halt. Control means through-connected with the drive automatically and repetitively cycles the machines through both injection and return strokes, and provides for a dwell of the injection piston between said strokes to assure full penetration of the plasticized material.

This invention relates to injection molding machines and more particularly to a portable and automatic injection molding machine particularly adapted for molding plastic fasteners in place.

An object of this invention is to provide a simple operating mechanism for a portable injection molding machine having means responsive to axial pressure for automatically causing movement, over a first predetermined distance, of plasticizing and injection pistons in a first injection stroke direction, and then movement of the pistons in a second retraction direction to position them for a subsequent injection stroke.

Another object of this invention is to provide means, in an injection molding machine, for automatically cycling an injection piston through injection and retraction motions and for effecting an automatic and adjustable-duration dwell of said piston, intermediate said motions, to assure full penetration of plasticized material injected thereby.

The invention provides a carrier interposed between, and movable relative to, a drive housing and a piston housing, to which carrier are connected the pair of pistons. A latching means is slidably supported by the carrier for engagement with the former or plasticizing piston for effecting movement of said piston. Biasing means constrain said latching means in engagement with said plasticizing piston only until said carrier moves a given distance, said predetermined distance. As the carrier is moved, both the pistons are carrier therewith until the plasticizing piston has moved said predetermined distance. At this point, camming means override the biasing means to release the constraint of the latching means, i.e., consequently to release said plasticizing piston from further travel. Even so, the carrier continues with additional movement causing further travel of the injection piston. Control means through-connected and cooperative with reversible power means in said drive housing automatically move said carrier and both said pistons, sequentially and repetitively, in said first and second, i.e., injection and retraction directions, and effect the dwell of said injection piston intermediate movement of said injection piston in said directions.

Another feature of the invention is in the feed mechanism. In general, the feed mechanism comprises a pair of feed wheels between which the stock is fed. One of the feed wheels is commonly mounted with a one-way clutch. A drive arm extends from the clutch and is pivotally connected to a drive link, and the drive link is connected to the carrier. As the carrier automatically cycles through its injection and retraction movements, it causes the drive arm to swing and, once in each of said cycles, through the cooperation of both feed wheels and the nip of the stock therebetween, causes rotation of the feed wheels and a resulting feed of stock into the machine.

Other objects, features and advantages of this invention will become more apparent to those skilled in the art from the following detailed description of a preferred embodiment thereof taken in conjunction with the accompanying drawings in which:

FIGS. 3 and 4 are, respectively, an enlarged and partially sectioned side view, a fragmentary and rear elevation view of the injection molding machine of FIGS. 1 and 2, with the control box removed therefrom for clarity;

FIG. 4 is taken from section 4—4 of, and is in the same scale as, FIG. 3;

FIG. 7 is a wiring diagram and schematic of control circuit for the machine.

Figure 1:
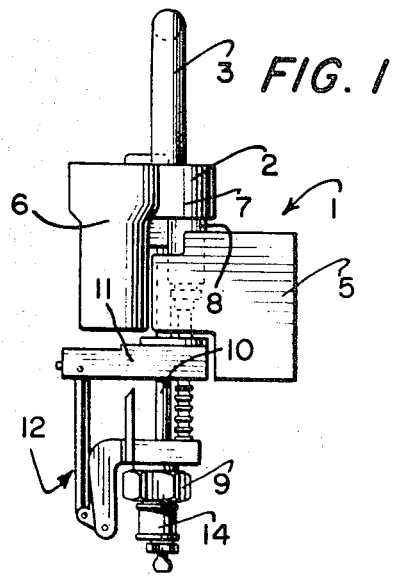
FIGS. 1 and 2 are, respectively, side and rear elevation views of an injection molding machine embodying the invention.
Figure 2:
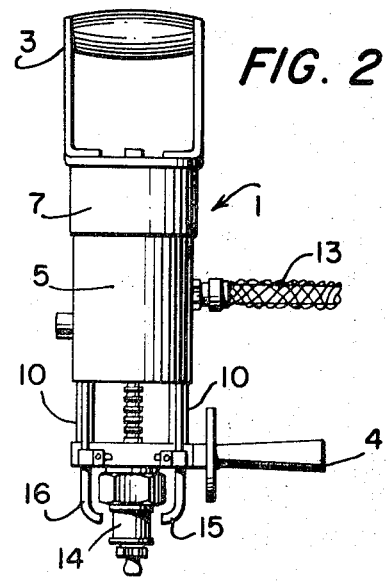

With reference to FIGS. 1 and 2 it can be seen that the injection molding machine 1 comprises a housing structure 2 which structure has a vertical, upwardly-extending handle 3 and a horizontal, lateral-extending handle 4 fixed thereto. A control box 5 is coupled to the structure 2 to provide for monitoring and operation of the machine and adjustment of the dwell of the plasticizing piston.

The housing structure 2 comprises a motor housing 6 and a power transmission housing 7, a clutch housing 8 and a piston housing 9. Piston housing 9 and clutch housing 8 are separated and spaced therebetween by vertically-disposed elongated members 10, and a carrier 11 is disposed between housings 8 and 9 for relative motion therebetween.

Between the carrier 11 and piston housing 9 there is carrier a feed mechanism 12. Feed mechanism 12 automatically supplies plastic stock to the piston housing 9 for working thereof therewithin by plasticizing and injection pistons. Finally, control box 5 receives a power cable 13 by means of which electrical power is communicated to the machine. A band-type heater 14 is disposed about the lower end of piston housing 9 for the heating of the plastic stock which is fed into the piston housing by mechanism 12.

As shown in FIG. 2, a conduit 15 extends downwardly from control box 5 into which one end thereof is mounted, and the depending end thereof curves inwardly to adjacency with the heater 14. Conduit 15 confines therewithin the electrical leads (not shown in FIG. 2) which power heater 14, to protect said leads from damage. A similar conduit 16 is mounted in the same manner as conduit 15 for protectively confining therewithin electrical leads (not shown in FIG. 2) which complete a circuit between a heat sensor, located within the heating head portion of piston housing 9, about which the band heater 14 is disposed, and a thermal switch mounted within control box 5. The sensor, as is explained subsequently in connection with FIG. 7, interrupts and provides continuity, respectively an conditions warrant, of electrical energy for the heater 14.

A plasticizing piston 17 and injection piston 18, respectively, are carried in plasticizing and injection chambers 19, 20, defined within piston housing 9, as shown in FIG. 3. Chambers 19 and 20 are interconnected by three small, diagonal channels 21 sloping downwardly from chamber 19 to chamber 20. Three channels 21 are used, rather than one, to yield a better separation of the plastic stock and a better heat transfer thereto; these effects permit a great number of cycles per minute in machine operation. The ends of pistons 17, 18 have "retracted" positions predetermined distances above the openings of channel 21 into their respective chambers 19, 20. Chamber 19 terminates in a cloesd end adjacent to the lowermost channel 21 but chamber 20 opens to nozzle 22.

Piston 17 is movable to the closed end of chamber 19 but piston 18 must move a greater distance to a workpiece positioned at the end of nozzle 22; our novel machine provides for this disparity of distances yet with single stroke actuation means.

Figure 5:
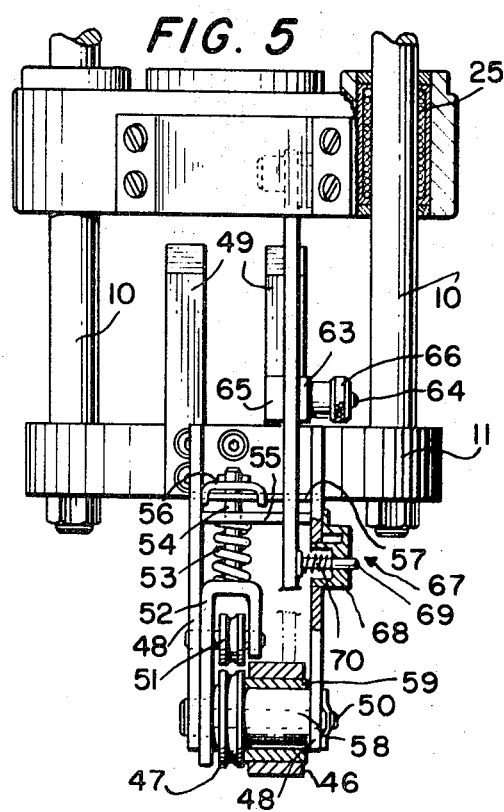
FIG. 5 is a partially sectioned view of the feed mechanism, a front elevation, in which a portion of the components thereof are shown sectional along the vertical centerline thereof, in the scale as that of FIGS. 3 and 4.

A feed opening 23 is provided into chamber 19 for the admittance therethrough of plastic material. As earlier noted, the housing structure 2 is joined, with spacing between piston and clutch housings 9 and 8, by means of elongated members 10 which are best seen in FIG. 4. Both said housings are also coupled together by a rotatable shaft 24 the upper end of which is joined to a spring-friction clutch (not shown) confined within clutch housing 8. Elongated members 10 and rotatable shaft 24 penetrate the transverse carrier 11; carrier 11 is supported on members 10 by means of ball bushings 25 (FIG. 5). Accordingly, carrier 11 can move between clutch housing 8 and piston housing 9 carrying therewith both pistons 17 and 18.

Clutch housing 8, as noted, confines a spring-clutch which, by resilient means, normally disengages a power transmission (not shown, but which is confined within housing 7) from shaft 24. Said clutch couples therebetween, but does not communicate drive therebetween until the axial length of the coupling between said clutch and said shaft is foreshortened. Accordingly, elongated members 10 are spring-loaded in their mountings in housing 7 (FIG. 4). Members 10 reduce to narrow diameters portions 26, within housing 7 and receive springs 27 about the narrow portions thereof, which resiliently space said members from housing 7. Springs 27 and portions 26 are disposed within chambers 28 formed within housing 7; springs 27 bear against the uppermost terminations of chambers 28 and thrust washers carried on portions 26. In response to axial pressure on structure 2, members 10 compress these springs 27 and foreshorten the coupling between shaft 24 and the clutch in housing 8. Thus, said clutch engages and imparts the drive of the power transmission to shaft 24.

Rotatable shaft 24 has formed thereon a ball screw section 29 which mates with a ball nut 30 disposed within carrier 11. Thus, as shaft 24 is caused to rotate, carrier 11 is moved either toward piston housing 9 or toward clutch housing 8. Shaft 24 is received by a bushing and pin 31 and 32, respectively, which bushing bears against a flange of housing 9 through a thrust washer 33.

A set screw 34 is fixed into the top of carrier 11 and is threaded into the upper end of piston 18, to fix piston 18 relative to carrier 11 so that as carrier 11 is moved, piston 18 is moved instantly and sequentialy therewith.

A passageway 35 is formed axially in carrier 11 and receives therein a headed adapter 36 carried on the upper end of piston 17. A U-shaped bracket 37 is mounted laterally to carrier 11 and confines therewithin a latch 38 for engagement thereupon with the headed adapter 36. Latch 38 slidably extends into and through a hollow 39 formed in carried 11, and into passageway 35, to engage the headed adapter 36 and receives, about mid-way along its length, a pressure plate 40. A pin 41 secures the pressure plate 40 to the latch 38; the pressure plate 40 is provisioned for receiving thereupon one end of a spring 42 which resiliently maintains latch 38 in penetration of passageway 35. The other end of spring 42 bears against a bearing which is carried by bracket 37 and which bearing receives one end of latch 38 therethrough. Pressure plate 40 also has a camming surface 43 which, as will be described subsequently, is provided to withdraw latch 38 from piston 17. The camming surface 43 is slidably received in a recess 44 formed in the bracket-mounting end of carrier 11.

The end of bracket 37 pivotally receives one end of a slotted link 45. The other end of link 45 is pivotally joined to one end of an arm 46, and arm 46 is finally oppositely coupled to a drive wheel 47. Drive wheel 47 is mounted in feed wheel brackets 48 which are secured to and depend downwardly from the piston housing 9. Piston housing 9 also mounts vertically thereon a pair of upwardly-extending camming actuators 49. Drive wheel 47 and said wheel brackets 48 comprise significant parts of feed mechanism 12 by means of which stock is fed into the machine through feed opening 23. Actuators 49, however, as is explained in the following text, facilitate the latching and unlatching of plasticizing piston 17. The stock to be fed to the machine through the opening 23 is in the form of a rod. The feed mechanism 12 therefor is supported by said brackets 48 fastened to piston housing 9. The drive wheel 47 is rotatably positioned on a shaft 50 carried on brackets 48 and is in alignment with opening 23. A driven wheel 51, FIG. 5, is positioned adjacent drive wheel 47. The rod stock is fed between the nip of wheels 51, 47, which is aligned with opening 23. To assure positive gripping of the rod stock and to provide for simple insertion of a new supply thereof between wheels 51 and 47, driven wheel 51 is mounted on a bracket 52 and biasing means, spring 53 is provided about a rod 54 extending upwardly from bracket 52 in penetration of stationary plate 55 for urging driven wheel 51 toward drive wheel 47. Rod 54 further carries a lift lever 56, which is pivotally mounted, by a pin 57 to brackets 48. When the rod-type stock is exhausted, an operator depresses lift lever 56 to lift rod 54, bracket 52, and driven wheel 51 against the bias of spring 53. Then a new supply of stock can be admitted between wheels 47 and 51, and the lift lever 56 is released to reestablish the nip of said wheels.

Drive wheel 47 receives on an axially extending portion 58 thereof a one-way clutch 59. Finally, drive lever arm 46 is connected to clutch 59.

The feed mechanism 12 provisions stock only as carrier 11 returns to the position shown in the drawings, a retracted position (from an alternate injection position) in which carrier 11 has retrieved pistons 17 and 18 from the "injection" direction movement of the automatic cycle.

As carrier 11 lowers toward piston housing 9, clutch 59 slips and wheel 47 does not rotate. As carrier 11 rises, clutch 59 engages and causes wheel 47 drivingly to nip the stock together with wheel 51 and feed said stock into opening 23.

As carrier 11 moves it operates feed mechanism 12, but, as just noted, only causes this mechanism to "feed" as it, the carrier 11, retracts, i.e., moves toward clutch housing 8. Link 45 of the feed mechanism 12 (FIG. 3) is pivotally joined to bracket 37, at one end thereof, by a pin 60 passed through a slot 61 formed in link 45. Toward the lower end of the slot, and on one surface of link 45, are formed horizontal splines 62. A complementarily-splined block 63 (FIG. 5) engages splines 62 and has a hole formed therein for receiving a small threaded bolt 64 which is permanently fastened to a block 65. The bolt 64 has a knurled nut 66 fastened on the threaded end thereof to secure blocks 63 and 65 to link 45, and to cause block 63 firmly to mate with the splines 62 of link 45. Carrier 11 lowers, in its injection function of motion, as pin 60 moves along the length of slot 61, until bracket 37 bears against block 63. Thereafter, further lowering of carrier 11 causes link 45 to move longitudinally and turn arm 46. Thus, by adjusting the positioning of block 63 and 65 on splines 62, it is possible to adjust the "reach" of arm 46 and, therefore, the length of rod-stock plastic which mechanism 12 feeds into opening 23—subsequently to be cut off by piston 17 during its plasticizing stroke.

To insure that link 45 is responsive only to engagement of bracket 37 with block 63, a friction pin assembly 67 is mounted on one bracket 48 (see FIG. 5) for frictional contact with link 45. Assembly 67 comprises a holder 68 which receives both a headed friction pin 69 and a pin-biasing spring 70. The head of pin 69 bears against link 45 to prohibit its longitudinal movement, due to the effects of gravity and weight, until bracket 37 engages block 63 on the plasticizing stroke, and until pin 60 reaches the uppermost termination of slot 61 on the retraction stroke as well. This provisioning of the friction pin assembly 67 assures a uniformity of feed of plastic stock.

A second friction pin assembly 71, FIG. 3, similarly operative as is that of assembly 67, is carried in housing 9 for frictional contact with plasticizing piston 17. Assembly 71 is provided to assure that piston 17 will remain "bottomed" in plasticizing chamber 19, even though carrier 11 proceeds to rise, until headed adapter 36 engages the constricted portion of passageway 35. This provisioning insures the proper "latching" of adapter 36 by latch 38.

Figure 6:
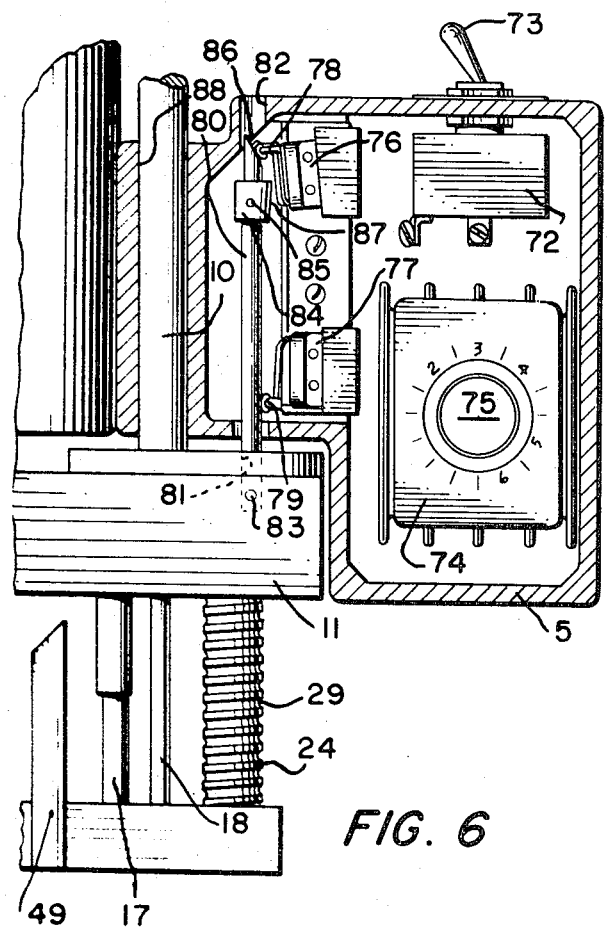
FIG. 6 is an elevation view of the intermediate portion of the machine, of the same side and scale as that of FIG. 3, with the control box prominently shown albeit with a dust cover thereof removed.

As shown in FIG. 6 control box 5 mounts a motor on-off switch 72 therewithin to the upper surface thereof, and an operating toggle lever 73 of the switch extends out of the box 5 for manipulation thereof by the operator. Control box 5 also contains a set-time delay relay 74. Set-time delay relay 74 has a time-setting control 75 extending therefrom externally of control box 5. The control box 5 also has a vertical mounting plate fixed therewithin to the opposite ends of which are mounted retraction limit switch 76 and injection limit switch 77. Said switches have extending therefrom actuators 78 and 79, respectively, which are disposed for engagement therewith by an adjacently-disposed actuator rod 80. Actuator rod 80 is mounted at one end thereof in a bore 81 formed in carrier 11. A bore 82 formed within the upper cover of control box 5 accommodates for the intrusion therewithin of the other end of the actuator rod 80. A set screw 83 secures the rod to the carrier 11, whereby the rod is caused to move axially of the machine as carrier 11 is moved between the piston and clutch housings 9 and 8. Actuator rod 80 carries a block 84 which is adjustably secured thereto by a set screw 85. Rod 80 has a camming of angled surface 86 formed on the upstanding end thereof for engagement with actuator 78. Block 84 has a camming, angled surface 87 on a lateral face thereof for engagement with actuator 79. Finally, control box 5 has formed therethrough a pair of parallel bores 88 (only one of which is shown) through which elongated members 10 penetrate for coupling of said control box to said housing structure 2. Fastening hardware (not shown) secures said control box 5 to said members. The control circuit, by means of which the machine is automatically cycled, is presented in FIG. 7. The control circuit 89 is supplied with electrical power by means of power inlet connector 90. Connector 90 accommodates three leads and a ground connection. Two "black" leads 91 and 92 and "white" lead 93 comprise the power lines.

The control circuit 89 supplies power to a universal, split-field, reversible motor 94 which is symbolically represented in the diagram solely by three input terminals D, U, and C. The terminals represent a "down" (D) terminal, an "up" (U) terminal, and "common" (C) for the motor field. The motor 94, not pictorially represented, is confined within motor housing 6.

A thermal switch 95 is contained in the circuit and is interposed in line 93. The thermal switch 95 operates in response to a heat sensing element 96 which is disposed in the heating head about which band heater 14 is fixed. As the heat of heater 14 becomes excessive, sensing element 96 causes thermal switch 95 to open and interrupt the supply of power to the heater 14; this is so as line 93, joined to heater 14, can be open-circuited by switch 95.

The control circuit 89 further comprises the on-off switch 72 by means of which electrical power is supplied to the time delay relay 74. Time delay relay 74 communicates power therethrough to the motor 94, to rotate same in forward or reverse directions, to cause an upward or downward movement of carrier 11. Accordingly, a line 97 communicates line 93, through the on-off switch 72, with the C terminal of motor 94. Further, a line 98 communicates line 91 through switch 72 with a terminal No. 8 of of the time delay relay 74. Terminal No. 8 is connected through a first set of normally-closed contacts (as shown in FIG. 7) of the relay 74 with a terminal No. 5 thereof, then to a line 99 which connects with the normally-closed contacts of the earlier-noted injection limit switch 77. From switch 77 the power is communicated by line 100 to the D terminal of the motor 94. Accordingly, power is introduced to the motor through terminals D and C causing the motor to rotate in one given direction so as to move the carrier 11 downward. It is to be noted that the relay coil 101, under the condition shown in FIG. 7, and while carrier 11 moves downward, is not energized. This is so because terminal No. 7 at one end thereof is connected by means of a line 102 to the normally-open contacts of limit switch 77. The other end of the coil 101 (at terminal No. 2), by means of a line 103, is connected, to the contacts of retraction limit switch 76. These latter contacts are normally-closed, but are held open, by the engagement of surface 86 with actuator 78, when carrier 11 is fully retracted (as it is shown in FIG. 7). With movement of carrier 11 downwardly, actuator rod 80 is carried therewith. As actuator rod 80 moves, it allows a closure of the contacts of limit switch 76. Accordingly, one side of the coil 101 is connected to the input power. However, the other side of the coil still presents an open circuit, and so the coil remains unenergized. As actuator rod 80 completes its travel, block 84 subsequently engages actuator 79 opening the normally-closed set of contacts in limit switch 77 and closing the normally-open set of contacts therein. A first result of opening the one set of contacts is to halt the motor in its "down" function; movement of actuator 79 interrupts the communication of relay terminal No. 5 with the motor D terminal. Closure of the other set of contacts supplies power therethrough through line 102 to terminal No. 7 of relay 74 i.e., to the other side of the coil 101. Therefore coil 101 can be energized to pull the two contacts sets of relay 74 in the opposite direction. However, relay 74 has a time setting. Means (not shown) coupled to time-setting control 75 (FIG. 6) delay the actuation of relay 74. Initially, then, electrical power from lines 91 and 98 is still communicated through terminals Nos. 8 and 5 of the relay 74. This causes piston 18 to "dwell" in the bottom of chamber 20. Subsequently, the time setting lapses and the relay 74 actuates. The two sets of contacts in relay 74 are pulled in the opposite direction, and electrical energy is then supplied, through relay terminals No. 8, and now No. 6, to a line 104 and the U terminal of motor 94. Accordingly, the motor 94 then turns in the opposite direction and moves carrier 11 upwardly away from piston housing 9.

As soon as carrier proceeds to move upwardly, surface 87 of block 84 on upwardly travelling rod 80 frees actuator 79. Thus, lines 100 and 99 are again communicated as the normally-closed contacts of switch 77 again close. Terminal No. 7 of relay 74 had been supplied power via line 102. Now, however, terminal No. 7 is supplied power via the following route: lines 91 and 98, via switch 72, to terminal No. 8 of relay 74, over to terminal No. 1, through the other adjacent set of relay contacts of relay 74, to terminal 3, and from there, via line 105, to terminal No. 7. So, coil 101 remains energized. Carrier 11 and rod 80 continue upwardly until surface 86 opens switch 76. This open-circuits terminal No. 2 i.e., coil 101 by interrupting the communication of lines 93 and 106 with line 103 and terminal No. 2, and both sets of contacts of relay 74 are released and return to the normal condition—i.e., that condition as shown in FIG. 7. Therefore, in accordance with the processes priorly explained, the motor is automatically reversed, and the machine automatically commences a "down" function.

The time delay of relay 74 provides for the dwell of injection piston 18, for, as noted, the adjustable time delay—adjustable by control 75—requires an elapse of time, between the "down" or injection function of the machine and the "up" or retraction function of the machine, before piston 18 is withdrawn from nozzle 22. A particular relay 74 is not specified herein, as set-time delay relays of this type, with means for adjustment of the delay thereof, are well known in the field of mechanisms to which our invention provides its advanced teachings.

In operation, then, with initial reference to FIG. 7, when connector 90 is mated with a source of power, and lever 73 is in the "on" position, motor 94 is empowered and rotates in that direction which will lower carrier 11 (FIG. 3). Then, as the operator applies axial pressure to handle 3, a foreshortening of the coupling between the power transmission in housing 7, the spring-friction clutch in housing 8 and shaft 24 occurs. This causes the spring-friction clutch to engage and drivingly turn shaft 24.

As shaft 24 turns, it causes carrier 11, via the interaction of ball screw section 29 and ball nut 30, to move toward piston housing 9. Pistons 17 and 18 are carried downward with carrier 11 until upright camming actuators 49 engage surface 43. With the latter engagement, plate 40 is moved against the bias of spring 42. Accordingly, latch 38 withdraws from passageway 35 and hollow 39, and allows adapter 36 to pass into passageway 35 as carrier 11 continues downward movement with piston 18.

Before adapter 36 is admitted for relative movement in passageway 35, piston 17 will have travelled to the bottom of chamber 19 and applied pressure to plastic stock admitted to chamber 19, cooperating with heater 14, to plasticize same, forcing the plasticized material through channels 21, into chamber 20, in advance of the downwardly moving piston 18.

As the injection piston 18 bottoms in chamber 20, it extrudes therefrom the plasticized material into or onto a workpiece disposed adjacent the nozzle 22. Control circuit 89, as earlier described, causes piston 18 to dwell in chamber 20 to assure full penetration of the material. Subsequently, after a lapse of time determined by the setting of control 75, carrier 11 proceeds to move upward under the power of now reversely-rotating motor 94. When carrier 11 reaches a given elevation, actuators 49 and surface 43 separate. Spring 42 returns latch 38 to engagement with adapter 36, and pin 60 is near the uppermost end of slot 61. Upon reaching the end of slot 61, pin 60 raises link 45, causes a rotation of arm 46 and, through operation of clutch 59 and rotation of wheel 47, causes a feed of material into feed opening 23. Then, surface 86 of rod 80 opens switch 76, and the machine automatically commences a successive cycle of operation.

Control circuit 89 is shown arranged for powering thereof by direct connection of connector 90 to a given source of electrical power. However, it may be advisable to connect circuit 89 with a variable source of power. That is, it can be useful to supply the machine from a power source having a powerstat in the lines leading to connector 90. The powerstat sometimes proves advantageous either with or without the temperature sensing element 96. This machine is often used intermittently with plastic material stock which tends to break down in a short time at high operating temperatures. Using the powerstat, with reference to a connected voltmoter, both the voltage and temperature can be dropped during idle periods avoiding difficulty. Then the power supply can be boosted back up when it is desired to start operating again. Also, the powerstat is useful in controlling the temperature of the machine for use with lower temperature plastic material stock.

While we have described our invention in connection with a specific embodiment thereof, it is to be clearly understood that this is done only by way of example and not as a limitation to the scope of our invention as set forth in the objects thereof and in the accompanying claims.

We claim:
1. A portable and automatic injection molding machine, comprising:
   a housing structure having means for receiving plastic material;
   a first piston, axially movable in said housing structure, for metering and plasticizing the received plastic material;
   a second piston, axially movable in said housing structure, for injection of the metered and plasticized material; and
   means automatically responsive to axial pressure on said housing structure for causing said pistons to move in said structure in a first direction to effect injection of said plastic material in an injection-function motion, and successively in a second direction to position said pistons for an injection-function motion.

2. A portable injection molding machine, according to claim 1, wherein:
   said first piston is movable a predetermined distance in said structure;
   said second piston is movable a greater distance in said structure; and
   said automatic moving means comprise means for single stroke actuation of both said pistons.

3. A portable injection molding machine, according to claim 1, wherein:
   said automatic moving means comprise means for single stroke actuation of said pistons for simultaneous movement of both said pistons in said first and second directions a predetermined distance, and for independent movement of one of said pistons, sequentially, over a final, additional distance in said first direction.

4. A portable injection molding machine, according to claim 1, wherein:
   said automatic moving means comprise means for single stroke actuation of said pistons for independent movement of one of said pistons through an initial distance, and for sequential movement of both said pistons a predetermined distance, in said second direction.

5. A portable injection molding machine, according to claim 3, wherein:
   said one of said pistons is said second piston.

6. A portable injection molding machine, according to claim 3, wherein:

said single-stroke actuation means comprise a carrier coupled to, and movable relative said structure in said first and second directions, having means coupling said first and second pistons thereto for movement therewith.

7. A portable injection molding machine, according to claim 6, wherein:

said carrier has coupled thereto first and second means constrained against one end of said first and second pistons, respectively, for causing said pistons to move said predetermined and additional distances, said first means being resiliently constrained.

8. A portable injection molding machine, according to claim 7, wherein:

said first means further having means for automatically releasing and imposing constraint thereof from and against, respectively, said first piston as said carrier commences that portion of movement relative said structure, in said first and second directions respectively, which corresponds to said additional distance.

9. The machine claimed in claim 1, including a feed mechanism comprising:

a drive wheel and an adjacent driven wheel having a nip therebetween aligned with an opening in said structure;

means connected to said drive wheel for moving said drive wheel at said nip only toward said opening regardless of the direction of movement imparted by said wheel-moving means;

said wheels and nip being cooperative to feed a supply of said plastic material into said opening.

10. The machine claimed in claim 9, wherein:

said wheel-moving means comprise a drive arm connected to said drive wheel to effect movement thereof;

a drive link pivotally connected to both said drive arm and said automatic moving means so that as said automatic-moving means moves said pistons it further moves said drive link which moves said drive arm causing said drive wheel to drive.

11. The machine claimed in claim 1, including said housing structure and pistons and further including separate plasticizing and injection chambers in said structure in which said pistons are positioned, and tubular channels angularly inclined from said plasticizing chamber to said injection chamber, connecting said chambers to communicate plasticized plastic material therebetween.

12. The machine claimed in claim 10, wherein:

said wheel-moving means further include a unidirectional clutch disposed between said drive arm and said drive wheel which communicates motion of said arm to said drive wheel only upon motion of said arm in one direction.

13. The machine claimed in claim 6, wherein:

said housing structure comprises a power transmission housing having a power transmission therein, a piston housing, and elongated members interposed therebetween for coupling together both said housings;

said carrier is coupled to said members for movement therealong relative said housings; and one end of each of said pistons is secured in said carrier, and the other ends thereof are slidably disposed in said piston housing so that movement of said carrier along said members causes said other ends of said pistons to slide within said piston housing; and said automatic moving means further comprise shaft means, rotatable relative to and coupling between said housings, having means for engaging said carrier to move same in response to rotation of said shaft means.

14. The machine claimed in claim 13, wherein said automatic moving means further comprise:

clutch means, normally disengaged, couplingly disposed between said power transmission and said shaft means and defining therebetween a normal distance; and means disposed between said members and said housing for resiliently maintaining said normal distance, said distance-maintenance means being responsive to said axial pressure to allow a shortening of said normal distance; and said clutch means being responsive to the shortening of said normal distance to cause driving engagement between said power transmission and said shaft means.

15. The machine claimed in claim 7, wherein:

said second means comprise a fastener replaceably fixed to said carrier and said second piston to assure concident and simultaneous movement of said second piston with said carrier;

said carrier has formed therewithin a passageway coextensive of the axis of said first piston; and one end of said first piston is slidably confined within said passageway to facilitate relative movement between said first piston and said carrier as well as coincident movement of said first piston with said carrier.

16. The machine claimed in claim 15, wherein:

said first means comprise latching means in penetration of said passageway to cause a prohibition of said relative movement.

17. The machine, claimed in claim 16, wherein:

said latching means are resiliently constrained to maintain said penetration, and slidable, relative said carrier, for withdrawal from said passageway.

18. The machine, claimed in claim 17, wherein:

said latching means include a camming surfaced member;

said housing structure mounts camming actuator means for engagement with said camming surface; and movement of said carrier causes engagement and disengagement of said camming actuator means with said camming surface causing said latching means to withdraw from, and to penetrate, respectively, said passageway.

19. The machine, claimed in claim 1, wherein:

said automatic moving means include means for causing an in-position dwelling of said pistons between movements thereof in said first and second directions.

20. The machine, claimed in claim 6, wherein:

said automatically moving means include means for causing an in-position dwelling of said pistons between movements thereof in said first and second directions;

reversible motor means, having forward and reverse power input means, and power transmission means both coupled to said carrier and cooperative for effecting said relative movement of said carrier;

means for admitting enabling power to said motor means;

means, having actuators extending therefrom, interposed between said power input means and said power admitting means for switching admitted power between said forward input means and said reverse input means; and actuator rod means mounted on said carrier disposed for operative engagement with said actuators to cause said switching means, successively, to switch admitted power between said forward and reverse input means.

21. The machine, claimed in claim 20 wherein:

said dwell-causing means comprise adjustable, set-time delay relay means, interconnected with said switching means, power input means, and said power admitting means, to delay the switching of admitted power between said forward and reverse input means.

22. The machine, claimed in claim 20, wherein:

said switching means comprise a plurality of switches,

11 one switch of said plurality thereof being effective to limit movement of said carrier in one of said directions, and another switch of said plurality being effective to limit movement of said carrier in the other of said directions.

23. The machine, claimed in claim 22, wherein:
said actuator rod means has a plurality of surfaces thereon, one surface of said plurality thereof being disposed for engagement with one of said actuators to cause operation of said one switch, and another surface of said plurality thereof being disposed for engagement with another of said actuators to cause operation of said another switch.

References Cited

UNITED STATES PATENTS

| | | |
|---|---|---|
| 2,107,190 | 2/1938 | Shaw. |
| 2,485,523 | 10/1949 | Ashbaugh _____ 18—12 |
| 3,154,811 | 11/1964 | Gardener _____ 18—12 |
| 3,166,793 | 1/1965 | Montpeat _____ 18—12 XR |

H. A. KILBY, JR., Primary Examiner